United States Patent Office 2,875,183
Patented Feb. 24, 1959

2,875,183

RESINOUS CONDENSATION PRODUCT OF A CHLORINATED AROMATIC DISULFONYL HALIDE AND A DIAMINE

Wilbur A. Murphey, Wilmington, Del., assignor to E. I. du Pont de Nemours and Company, Wilmington, Del., a corporation of Delaware No Drawing. Application June 30, 1955
Serial No. 519,268

7 Claims. (Cl. 260—79.3)

This invention relates to a novel and useful product and to a process for its production. More specifically it is concerned with a novel fibre-forming polysulfonamide, a process for its production and the shaped articles produced therefrom.

It is an object of the present invention to provide a novel class of chlorine substituted polysulfonamides. Another object is to provide a shaped article of a polysulfonamide possessing flame retardant properties.

These and other objects will become apparent in the course of the following specification and claims.

In accordance with the present invention a polysulfonamide is provided containing recurring units of the formula:

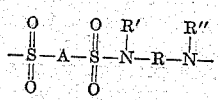

wherein —A— is a divalent carbocyclic radical from the class consisting of polychlorinated phenylene and polychlorinated biphenylene separating the sulfone substituents by a chain of at least three carbon atoms, —R— is a divalent organic radical, —R′ and —R″ are members of the class consisting of hydrogen and lower alkyl. In general these materials may be prepared by an interfacial polymerization, i. e., the reactants are contacted in such a way that the reaction zone is at, or is immediately adjacent to, a liquid-liquid interface and most of the molecules of at least one of the intermediates must diffuse through liquid diluent to arrive at the reaction zone. Specifically the technique involves mixing a diamine in one liquid phase with an acid chloride in a second liquid phase immiscible with the first phase, at least one of the phases including a liquid diluent, the admixture being maintained until the condensation polymerization has occurred to the extent desired. An embodiment of such a process is in United States Patent No. 2,667,468, dated Jan. 26, 1954. Those polysulfonamides within the general class defined above are particularly desirable, the chlorine substituents of which are vicinal. The shaped structures of such material are flameproof, i. e., they do not support the propagation of a flame.

The following examples are cited to illustrate the invention. They are not intended to limit it in any manner.

Example 1

50 grams of ortho-dichlorobenzene is added, drop by drop, to 500 grams of chlorosulfonic acid over a period of ½ hour. The mixture is then refluxed for 24 hours. After cooling to 50° C., the product is precipitated by slowly pouring the reaction mass over ice. The product, 4,5-dichloro-1,3-benzenedisulfonyl chloride, is washed with distilled water, dried over phosphorous pentachloride and thereafter recrystallized. It has a melting point of 115.2–116.2° C.

A solution of 8.6 grams of 4,5-dichlorobenzene-1,3-disulfonyl chloride in 200 cc. of chloroform is added, with rapid agitation, to 200 cc. of an aqueous solution containing 2.9 grams of hexamethylene diamine, 5.3 grams of sodium carbonate and 2 grams of sodium lauryl sulfate. Agitation is continued for ¼ hour. 100 cc. of alcohol are then added, the product is filtered off, washed with water and alcohol, redissolved in acetone, precipitated in 600 cc. of water and dried for 4.5 hours at 75–85° C. A yield of 75% of theoretical is obtained. The product having a chlorine content of 17.5% has an inherent viscosity of 1.20 in sulfuric acid and 0.90 in dimethylformamide. It sticks to a bar heated to 190° C. but does not give a clear melt up to 380° C.

The polymer is soluble in acetone, sulfuric acid, 10% aqueous caustic and dimethylformamide. A film cast from an acetone solution is flameproof and is shown by X-ray examination to be very amorphous with less than 20% crystalline material.

The polymer, prepared as described above, is spun into a yarn by extruding a 10% aqueous caustic solution containing 25% by weight of the polymer into a conventional viscose rayon coagulating bath. A 100-hole spinneret in which each hole has a diameter of 0.003 inch is employed. After a bath travel of 114 inches, the yarn is collected at a rate of 38 feet per minute. It is drawn at room temperature to 2.7 times its extruded length.

Wet spinning may also be accomplished by extruding a solution of the polymer in dimethylformamide or pyridine into water. Dry spinning employing acetone as the polymer solvent is also satisfactory.

Example 2

Meta-dichlorobenzene is substituted for the orthodichlorobenzene in the sulfonation procedure of Example 1. 4,6-dichloro-1,3-benzenedisulfonyl chloride is produced.

A solution of 100 cc. of methylene chloride containing 4.3 grams of 4,6-dichloro-1,3-benzenedisulfonyl chloride is added with rapid agitation and over a 15 second period, to 100 cc. of an aqueous solution containing 1.46 grams of hexamethylene diamine, 2.65 grams of sodium carbonate and 1.0 gram of sodium lauryl sulfate. The mixture is stirred 15 minutes at room temperature and a yield 62% of theoretical of a linear polymer containing 18.6% chlorine and melting at 167° C. is obtained. Its inherent viscosity is 0.59 in dimethylformamide and 0.92 in sulfuric acid. It is soluble in m-cresol, dimethylformamide, 10% caustic, acetone, and pyridine. This polymer is spinnable into fibres. However, its shaped structures support flame propagation.

Repeating the above experiment, but substituting chloroform for methylene chloride yields the same product, having a slightly lower inherent viscosity, i. e., 0.70 in sulfuric acid and 0.49 in dimethylformamide.

Example 3

A solution of 8.5 grams of 4,5-dichloro-1,3-benzenedisulfonyl chloride in 150 cc. of methylene chloride is added to 100 cc. of an aqueous solution containing 4 grams of sodium lauryl sulfate, 8 grams of sodium hydroxide, 4 grams of sodium carbonate and 5.25 grams of bis(4-aminocyclohexyl) methane. After stirring for 15 minutes, an 86% yield of polymer based on theoretical, melting at 220° C. is isolated. It has a chlorine content of 13.7%, an inherent viscosity of 0.26 in dimethylformamide and its shaped structures are flameproof.

Example 4

181.5 grams of 1,2,3-trichlorobenzene are added slowly to 1000 grams of gently boiling chlorosulfonic acid. After refluxing gently for approximately 20 hours, the reaction mixture is hydrolyzed by being poured over drained ice. The precipitated product is washed thoroughly with cold water and thereafter dried. After four recrystallizations from benzene and decolorization, large colorless crystals of 4,5,6-trichloro-1,3-benzenedisulfonyl chloride, melting at 180° to 181° C., are obtained in 34% yield.

A solution of 9.46 grams of 4,5,6-trichloro-1,3-benzenedisulfonyl chloride in 100 cc. of methylene chloride is added to a mixture of 190 cc. of an aqueous solution containing 11.2 grams of hexamethylene diamine, 4 grams of sodium lauryl sulfate and 5.3 grams of sodium carbonate. After 1/4 hour, 9.5 grams of polymer having a chlorine content of 23.8% and a polymer stick temperature (i. e., the temperature at which the solid sticks to a heated bar when the polymer is gently rubbed thereon) of 170° C. The shaped structures do not support a flame.

*Example 5*

A solution of 7.1 grams of 4,5,6-trichloro-1,3-benzenedisulfonyl chloride and 2.03 grams of 1,5-naphthalenedisulfonyl chloride in 100 cc. of methylene chloride is added, with rapid agitation, to 200 cc. of an aqueous solution containing 3.5 grams of hexamethylene diamine, 1 gram of sodium lauryl sulfate and 5.3 grams of sodium carbonate. After stirring for 15 minutes, the copolymer formed is filtered and dried. A yield 90% of theoretical is obtained. The product has a polymer stick temperature of 169° C., a chlorine content of 18.8% and is flameproof.

A polymer having a chlorine content of 13.3% is made by using 4.73 grams of 4,5,6-trichloro-1,3-benzenedisulfonyl chloride and 4.07 grams of 1,5-naphthalenedisulfonyl chloride in the above process. Its shaped structures are flameproof. It has a polymer stick temperature of 175° and is obtained in 90% yield.

Another polymer whose shaped structures are flameproof, containing only 7.4% chlorine is made by employing 2.37 grams of 4,5,6-trichloro-1,3-benzenedisulfonyl chloride and 6.1 grams of 1,5-naphthalenedisulfonyl chloride in the above process. The product has a polymer stick temperature of 175° C.

*Example 6*

The disulfonyl chloride of trichlorobiphenyl is prepared from trichlorobiphenyl ("Arochlor" 1242, sold by Monsanto Chemical Company of St. Louis, Mo.) following the technique described in Example 1. A solution of 11.5 grams of the disulfonyl chloride in 80 cc. methylene chloride is added to 200 cc. of an aqueous phase, containing 5.35 grams of bis(4-amino-3-methyl-cyclohexyl) methane, 1 gram of sodium lauryl sulfate and 10 grams of sodium carbonate. After stirring 15 minutes, 14.2 grams or 95% of theoretical of polymer is isolated. It has an inherent viscosity of 0.10 in dimethylformamide and melts at 220° C. Its chlorine content is 18.2% and its shaped structures are flameproof.

*Example 7*

A solution of 11.5 grams of the disulfonyl chloride of trichlorobiphenyl in 100 cc. of methylene chloride is added to 100 cc. of an aqueous solution containing 1.8 grams of ethylene diamine, 1 gram of sodium lauryl sulfate, 2 grams of sodium hydroxide and 2.2 grams of sodium carbonate. After 15 minutes stirring at room temperature, 8.2 grams of polymer is obtained. It has a polymer melt temperature of 232° C. and its shaped structures are flameproof.

The interphase polymerization reaction is preferably effected by dissolving diamine or its soluble salt in water, adding, with strong agitation, a solution of the chlorinated aromatic disulfonyl chloride in a water-immiscible organic solvent which is inert to the reactants, to the aqueous amine solution thereby forming an emulsion of said solutions. When the amine acid salt is employed, it is neutralized by slowly adding an alkaline neutralizing agent to the emulsion. The release of the free amine in this manner enables the latter to react immediately with the chlorinated aromatic disulfonyl chloride to form the desired sulfonamide. The alkali addition is continued until all of the amine has been made available for the reaction. Stirring is continued at high speed after all the alkali has been added to insure completion of the reaction, and the solid polymer is filtered from the liquid phase and dried. It is essential that the solvent or diluent employed for a specific reactant does not destroy the sulfonamide-forming ability of the reactant. It is not essential for the solvent or diluent used in one phase to be completely inert to the reactant in the other phase, but it is essential that the two reactants be more reactive toward each other than either reactant is to the solvent or diluent of the other phase.

It is at times desirable to saturate the solvent for the respective reactant with non-reactive solutes so as to produce a better yield, a higher molecular weight, or a more useful polymer. Such non-reactive substances may be salts such as sodium chloride, potassium bromide, lithium sulfate, and the like.

The interphase technique may be varied considerably. Thus the isolation of the polymer may be accomplished after acidifying the emulsion. At times it is advantageous to add an emulsifier to the diamine solution before the disulfonyl chloride is added. Where the amine per se, rather than its acid salt, is used a simultaneous addition of the acid acceptor and the acid chloride is often preferable. Furthermore, the acid acceptor, which may be excess amine, may be present in the diamine phase prior to addition of disulfonyl chloride.

The process for the preparation of polysulfonamides by interphase polymerization can be carried out over a considerable range of temperatures from just above the freezing point of the phase having the highest freezing point up to temperatures at which decomposition products form to an objectionable extent. However, in view of the rapidity with which fiber-forming polysulfonamides are formed at moderate temperatures, there is no advantage in using temperatures higher than 150° C., and it is preferred that the reaction be carried out in the moderate temperature range of $-10°$ to $+60°$ C.

Since the reaction rate of diamines with the chlorinated aromatic disulfonyl halides is rapid at room temperature, it is preferable that the addition of the two phases containing the separate reactants be accompanied by sufficiently rapid stirring to produce an emulsion of fine particle size. Such emulsions may be equally well produced by other means, for example, by impinging two high velocity liquid streams upon each other in a suitable manner. When an emulsion of fine particle size is provided, the available diamine and/or the chlorinated aromatic disulfonyl halide is completely used up in a matter of a few seconds or, at most, in a matter of a few minutes, depending to an extent on the sum total of the reaction conditions.

The reactants do not need to be employed in equivalent proportions. The excess of one reactant simply remains in the supernatant liquid from which the polysulfonamides precipitate. It has been found that the interphase polymerization of diamines with disulfonyl halides yields polysulfonamides of high molecular weight whether one reactant is in excess by 300% or even more, or whether the reactants are in equivalent amounts. However, for purposes of economy, it is usually desirable to employ the reactants in equivalent amounts.

The diamines which are useful in the preparation of the polymers of this invention include the primary and secondary aliphatic diamines, aromatic diamines, aralkyl diamines, and cycloaliphatic diamines. Among these may be mentioned ethylene diamine, tetramethylene diamine, pentamethylene diamine, hexamethylene diamine, 2,5-dimethylhexamethylene diamine, decamethylene diamine, piperazine, 2,5-dimethylpiperazine, bis(N-aminomethyl)-piperazine, N,N'-dimethylhexamethylene diamine, N-methylhexamethylene diamine, phenylene diamines, bis-(4-amino-3-methylcyclohexyl)methane, bis(4-aminocyclohexyl)methane in its liquid or solid isomer, gamma-gamma'-dipiperidyl, N,N'-di(2-aminoethyl)piperazine, and the like.

The preferred polychlorinated aromatic disulfonyl halides useful in preparing the polymers of this invention are the m- and p-benzene-disulfonyl halides carrying at least two ring chlorine substituents and polychlorinated biphenyldisulfonyl halides with an average of more than two ring chlorine substituents per biphenyl group. Those benzene derivatives wherein the ring chlorine substituents are vicinal are particularly valuable due to their flame retardent properties.

Copolysulfonamides are prepared by substantially the same procedure as homopolysulfonamides by the process of this invention. Where the reactants are one diamine and one disulfonyl halide a homopolysulfonamide results. Where the reactants are two or more diamines and one disulfonyl halide or two or more disulfonyl halides and one diamine or two or more disulfonyl halides and two or more diamines, copolysulfonamides are produced having compositions and properties which depend on the ratio and reactants of the intermediates.

The aqueous solution of diamine employed preferably contains from 0.1 to 1.0 mol of the diamine per liter of solution while the water-immiscible organic solvent solution of the disulfonyl chloride should contain, preferably, from 0.1 to 1.0 mol of the disulfonyl chloride for each liter of solution employed. As suitable water-immiscible solvents which may be employed for dissolving the disulfonyl chloride there may be mentioned benzene, toluene, xylenes, carbon tetrachloride, chloroform, methylene chloride, trichloroethylene, cyclohexane, ortho-dichlorobenzene, and chlorinated biphenyl.

During the emulsion polymerization reactions whereby the polysulfonamides are obtained, hydrochloric acid is formed as a by-product and an acid acceptor is added as previously mentioned. An excess of diamine may be employed. Examples of suitable acid acceptors include sodium carbonate, sodium bicarbonate, disodium phosphate, sodium hydroxide, trisodium phosphate, and the like.

An emulsifying agent may be employed to assist emulsion formation. It may be cationic, anionic, or non-ionic. A representative example of a cationic emulsifying agent is "Lorol" pyridinium chloride ("Lorol" is the trade name for the mixture of aliphatic alcohols obtained by hydrogenation of cocoanut oil). A representative example of a nonionic agent is "Tween" (Atlas Company, polyoxyethylene derivatives of sorbitan monoesters of long-chain fatty acids), and representative examples of the anionic emulsifying agents are soaps, the amine salts, and "Duponol ME" (Du Pont Company's name for sodium "Lorol" sulfate), etc.

As is illustrated in the examples, those polysulfonamides and copolysulfonamides within the general formula wherein vicinal chlorine substitution upon the aromatic disulfonic acid residue occurs, are particularly valuable in yielding flameproof shaped structures. In addition to these derivatives, those polysulfonamides and copolysulfonamides within the general formula and containing at least about 7% by weight chlorine also yield flameproof shaped structures. In general, a chlorine content of from about 10% to about 20% is preferred. Higher chlorine content is permissable.

In the development of the products of the present invention, it has been observed that the use of a strong alkali as an acid acceptor tends to promote formation of imide linkages in sulfonamide polymers of high chlorine content, for instance, those prepared from 4,5,6-trichloro-1,3-disulfonyl chloride. This can be avoided by use of less basic acid acceptors, for instance, sodium carbonate, sodium bicarbonate, or the like. Furthermore, where such imide formation occurs, the product may be hydrolyzed to the linear sulfonamide polymer, such as by solution in sulfuric acid followed by reprecipitation in water.

The flameproof polysulfonamide polymers and copolymers described hereinbefore have utility in many and varied fields. They may serve as ingredients of coating compositions, they may be pressed to films, or they may be molded into useful plastic articles. They are useful by themselves for the manufacturing of all kinds of textile materials, especially where flameproofness is desirable, as for example, in knitted, woven, and non-woven garments, in curtains, draperies, carpets, etc. On the other hand, these flameproof polymerization products are ideal polymers to reduce flammability of established useful polymers by blending of a highly chlorinated polysulfonamide with polyesters, polyacrylonitriles, polyureas, polyurethanes, polyamides, polyvinyls, and the like.

Many equivalent modifications will be apparent to those skilled in the art from a consideration of the above without a departure from the inventive concept.

What is claimed is:

1. A polysulfonamide of a disulfonyl halide and a diamine containing recurring units of the structure:

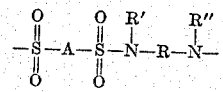

wherein —A— is a divalent carbocyclic radical from the class consisting of polychlorinated phenylene and polychlorinated biphenylene which separate the sulfone substituents by at least three carbon atoms, —R— is a member of the class consisting of a divalent hydrocarbon radical and a radical of the formula $$-\text{alkylene}-N\begin{matrix}CH_2-CH_2\\ \\CH_2-CH_2\end{matrix}N-\text{alkylene}-$$

and R' and R'' are members of the class consisting of hydrogen and lower alkyl.

2. A polysulfonamide of a disulfonyl halide and a diamine containing recurring units of the structure:

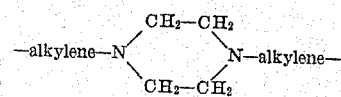

wherein $x$ is an integer greater than one and the hexagon represents the benzene nucleus.

3. The polysulfonamide of claim 2 wherein the chlorine substituents are vicinal.

4. The polysulfonamide of claim 3 wherein $x$ is two.

5. The polysulfonamide of claim 2 wherein alkylene is hexamethylene.

6. A polysulfonamide of a disulfonyl halide and a diamine containing recurring units of the structure:

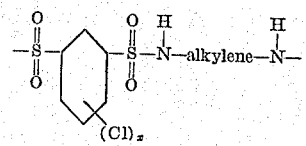

wherein $y$ and $z$ are small integers and the hexagons represent the biphenyl nucleus.

7. A polysulfonamide of a disulfonyl halide and a diamine containing recurring units of the structure:

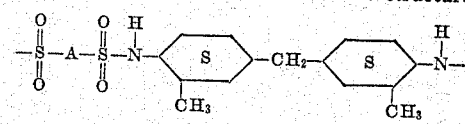

wherein —A— is a divalent carbocyclic radical from the class consisting of polychlorinated phenylene and polychlorinated biphenylene which separate the sulfone substituents by at least three carbon atoms and the hexagons represent the cyclohexane nuclei.

References Cited in the file of this patent

UNITED STATES PATENTS

| | | |
|---|---|---|
| 2,667,468 | Jones | Jan. 26, 1954 |
| 2,667,507 | Jones | Jan. 26, 1954 |
| 2,759,816 | Minsk | Aug. 21, 1956 |

OTHER REFERENCES

Ellis: "Chemistry of Synthetic Resins," vol. II, pages 1146, 1147, Reinhold (1935).